United States Patent

[11] 3,590,291

| [72] | Inventors | Andrew J. Spisak<br>Pittsburgh;<br>Thayer L. Dillman, North Versailles, both of, Pa. |
|---|---|---|
| [21] | Appl. No. | 875,351 |
| [22] | Filed | Nov. 10, 1969 |
| [45] | Patented | June 29, 1971 |
| [73] | Assignee | Westinghouse Electric Corporation<br>Pittsburgh, Pa. |

[54] BRUSHLESS EXCITER COMPONENT ASSEMBLY
7 Claims, 6 Drawing Figs.

[52] U.S. Cl. ............................................. 310/68 D,
310/72
[51] Int. Cl. ............................................. H02k 11/00
[50] Field of Search............................................. 310/68,
68.4, 66, 71, 72, 159, 171

[56] References Cited
UNITED STATES PATENTS

| 3,354,330 | 11/1967 | Storsand | 310/68 |
|---|---|---|---|
| 3,371,235 | 2/1968 | Hoover | 310/68 |
| 3,412,271 | 11/1968 | Hall | 310/68 |
| 3,457,440 | 7/1969 | Horsley | 310/68 |

Primary Examiner—Milton O. Hirshfield
Assistant Examiner—R. Skudy
Attorneys—A. T. Stratton, F. P. Lyle and Gordon H. Telfer ABSTRACT: A rotating rectifier-voltage suppressor combination for brushless generator excitation with minimized weight and axial length is provided having a heat sink mounted on the inner surface of a rectifier wheel rim; at least one diode and a voltage suppressor package are mounted on the same heat sink. The voltage suppressor package includes at least a capacitor with possible additional components including a voltage divider resistor in parallel with the capacitor and diodes and/or a resistor in series with the capacitor. Simplified mounting means are provided to permit easy removal of the heat sink, diodes and voltage suppressor package (as well as a fuse protecting against failure of a diode or capacitor) for inspection and repair.

PATENTED JUN29 1971 3,590,291

INVENTORS
Andrew J. Spisak
and Thayer L. Dillman
BY
*Gordon K. Colton*
ATTORNEY

BRUSHLESS EXCITER COMPONENT ASSEMBLY

BACKGROUND OF THE INVENTION

1. Field of the Invention

This invention relates to brushless AC power generating systems and particularly to component support and interconnection arrangements for rotating rectifiers and voltage suppressors in exciters for such systems.

2. Description of the Prior Art

In a rotating rectifier brushless generating system, a pilot exciter and a regulator provide controlled field energization for an alternating current exciter. The rotating armature of the exciter in turn produces an alternating voltage which is applied to a rotating rectifier physically disposed with the exciter armature on a common shaft. The rectified voltage is then applied to the main generator rotating field winding which is also disposed on the common shaft. Brushless power systems are desirable because of the elimination of maintenance and replacement problems normally associated with brushes, commutators and collector rings.

The rotating rectifier assembly usually comprises a plurality of semiconductor diodes mounted on one or more shaft supported wheels with the diodes electrically interconnected in a suitable excitation circuit between the exciter armature and the main generator rotating field winding. Fuses are usually provided in electrical series with the diodes and they may also be disposed on the rectifier wheels. Capacitors and resistors are also employed in such systems to suppress voltage spikes through the diodes and such components are desirably also wheel supported.

Demands for increasingly large brushless exciter ratings have necessitated an increase in the number of diodes, capacitors, fuses and resistors on the rectifier wheel. An example of a prior approach to this problem is described in U.S. Pat. No. 3,371,235, Feb. 27, 1968 to Hoover. That patent should be referred to for background with respect to brushless exciter systems in general and also to component mounting schemes on rectifier wheels. As there disclosed, the rectifier wheel has a number of elements mounted on its inner rim surface. These include, in each of a plurality of circumferentially spaced subassemblies, a heat sink on which is positioned a diode, a fuse, and a capacitor with associated interconnections and resistive elements. The capacitor is separately mounted on the wheel rim and axially spaced from the heat sink. Such a configuration for 48 diodes on a wheel can exceed safe stress limits for operation at 3,600 r.p.m., the usual operating speed.

Utilizing a pair of diodes in each component configuration, instead of just one, would result in an improvement since essentially twice the number of diodes and twice the rating can be achieved with the same wheel diameter. There are, however, disadvantages. The increase in the number of diodes and corresponding increase in capacitor size requires an increased axial length of the rectifier wheel and lengthening of the shaft. This lengthening as well as the increased weight of the rectifier wheel and other rotating components lowers the mechanical stability of the system.

Additionally, in such prior configurations adapted to include two diodes, there would be encountered some difficulty in the accessibility and assembly of the capacitors and resistors. In such an arrangement the capacitors would be back further from the open side of the wheel than when one diode is used. The increased length of the wheel causes a substantial increase in the polar moment of inertial of the wheels which generally causes greater torsional stresses in the shaft during a short circuit. Windage losses are increased thus requiring larger cooling and ventilating equipment. Additional shaft length also requires that expenses increase through the associated structural elements required for the finished system. In such prior systems, it is also the case that the system was not protected in the event of a short in the capacitor.

SUMMARY OF THE INVENTION

Among the objects of this invention are to provide a rectifier-voltage suppressor assembly for at least one diode (preferably two or more diodes) and a capacitor with improved mounting and support for the capacitor, shorter axial length of the assembly than has previously been required, a high degree of mechanical stability for the components and their wiring as well as reduced weight and lower moment of inertia. Another purpose is to provide improved accessibility of the capacitors, diodes and fuse elements.

These and other objects of the invention are achieved through a combination that includes a plurality of rectifier-voltage suppressor assemblies on an inner surface of the rectifier wheel rim. Each assembly comprises a heat sink mounted on the wheel surface and components mounted on the heat sink. The components include the diodes supported on the heat sink in electrically and thermally conductive relation and also a voltage suppressor package in such relation to the same heat sink.

In the typical case, the diodes are mounted by a threaded stud in the heat sink and the voltage suppressor package fits over the diodes by reason of radially extending apertures therethrough within which the diodes fit. The voltage suppressor package may comprise an exterior wall of high strength glass laminate or steel with appropriate insulation, within which the capacitor and any desired resistors may be positioned. Alternatively, resistors may be disposed upon the cover of the suppressor package, which cover may comprise laminated insulation material. The package also includes a metal base plate mechanically secured to the heat sink. It is desirable that voids within the voltage suppressor package be filled such as by a suitable epoxy resin to support wiring and stabilize the capacitor and any resistors therein.

In its preferred form, the invention also provides means for removing intact the heat sink, diode-suppressor, and fuse configuration. This includes a captivated bolt extending through the wheel into the heat sink and also a fuse mounting bolt at the axial extreme of the wheel. The loosening of these bolts permits removal of the entire rectifier-suppressor and heat sink unit, as well as the fuse, so that now the capacitor and any included resistors are as readily accessible for inspection or replacement as were the diodes previously. Removal of the components requires no unfastening operations to be performed on the inside of the wheel rim. Thus only limited space need be provided.

Provisions of the capacitor on the heat sink in parallel with the diodes not only provides mechanical advantages but also places the capacitor in series with the fuse whereas before it was in parallel with the fuse. Now any shorting failure of the capacitor is indicated by the fuse for extra reliability of the system.

DESCRIPTION OF THE PREFERRED EMBODIMENTS

Figure 1:
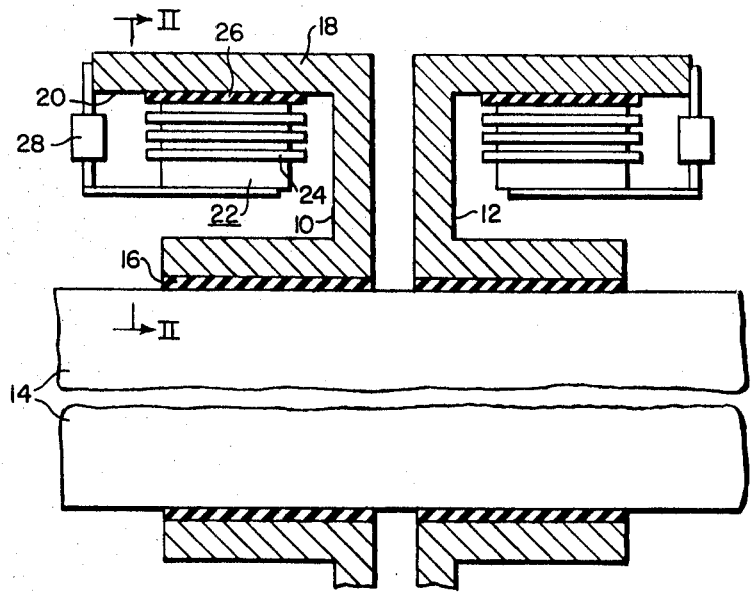
FIG. 1 is a partial sectional view of a rectifier wheel assembly in which the present invention is used.
Figure 2:
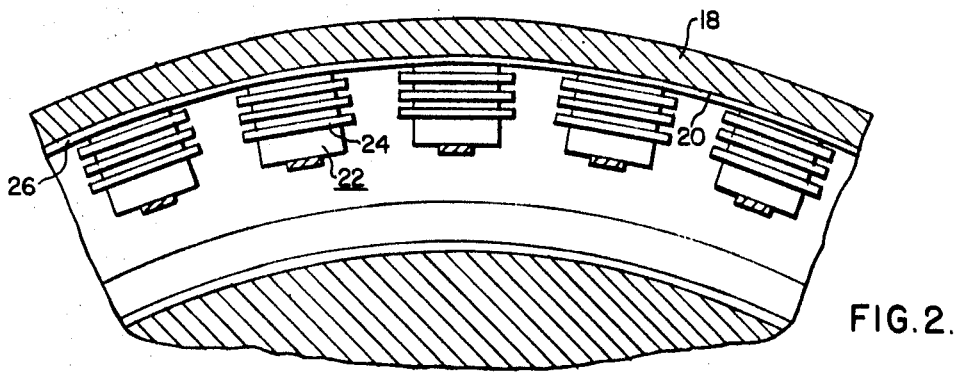
FIG. 2 is a partial sectional view taken along the line II—II of FIG. 1.

FIGS. 1 and 2 illustrate the general nature of a rectifier wheel assembly in which the present invention may be practiced. These figures are simplified illustrations that omit certain elements such as phase leads and certain other conductors. For background information with respect to the functions of such a rectifier wheel in a brushless exciter system reference should be made to other literature such as U.S. Pat. No. 3,371,235, Feb. 27, 1968 to Hoover.

A pair of back-to-back wheel elements 10 and 12 are supported on a shaft 14 that is also connected to the main generator and exciter elements of the system (not shown). A layer of insulation 16 is provided between the wheels and the shaft. The wheels are of conductive material with outside bus rims 18 having radially inwardly facing surfaces 20 used for supporting components.

The components on the rectifier wheel generally comprise in accordance with this invention an enclosure 22 that surrounds at least diode and voltage suppressor elements and is mounted on a heat sink 24. The heat sink is shown insulated from the bus rim by insulation layer 26. A fuse 28 is connected to one side of the rectifier-capacitor unit 22 and to the bus rim 18. A plurality of such component configurations are positioned on the bus rim inner surface as shown in FIG. 2, it being desirable generally to provide as many such diodes and associated elements as possible for the highest rating of the generator.

Figure 4:
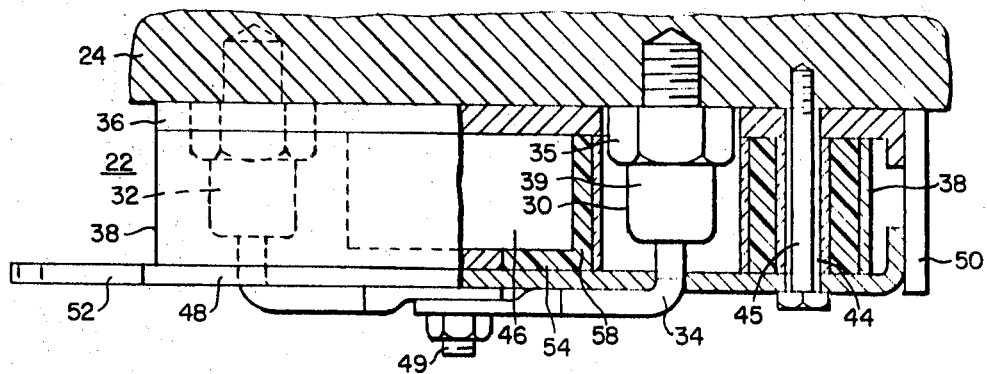
FIG. 4 is a partial sectional view taken along the line IV—IV of FIG. 3.
Figure 3:
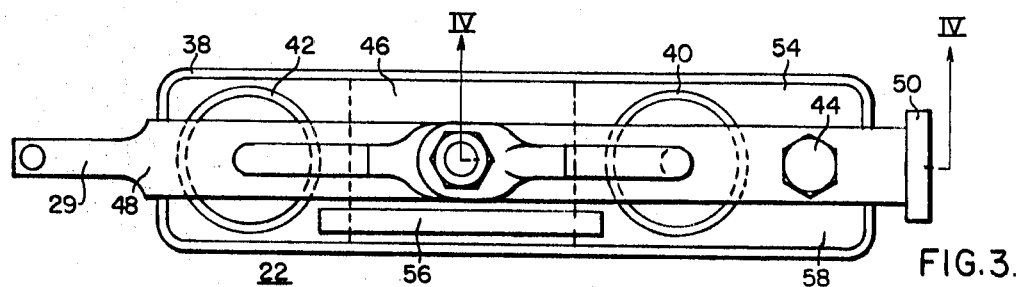
FIG. 3 is a plan view of a rectifier-voltage suppressor configuration in accordance with one embodiment of this invention.

FIGS. 3 and 4 illustrate a component configuration in accordance with this invention. The heat sinks 24 are structures of thermally conductive material (preferably with heat dissipating fins) insulated from the wheel rim 18 and joined thereto by means such as suitably insulated bolts, not shown. A pair of diodes 30 and 32 are secured in thermal and electrically conductive contact to the heat sink 24 and are further provided with some radially inwardly extending terminal means 34 for connection as will be explained. As used herein the term "diode" is intended to designate a semiconductor element as well as its intimately associated packaging (in the example such packaging includes a hexagonal base 35 with a threaded stud 37 extending from it, and a cap 39). The diodes may be of various types and variously secured to the heat sink. For example, pressure bending may be used as an alternative to the threaded engagement shown.

In this example, there are two diodes 30 and 32 affixed to each heat sink 24. The number of diodes is not critical. In general, it would be preferred to use a large number of diodes for the highest machine rating. On the other hand, cost and size considerations require use of minimal components. Thus a compromise is preferred and the use of two diodes has been found generally sufficient for achieving required ratings without unduly extending the wheel size or encountering associated problems. Therefore, in accordance with this invention the use of a pair of such diodes on each heat sink is preferred although only one or more than two diodes may be used consistent with the broader aspects of the invention.

A voltage suppressor package 58 is also disposed on each heat sink 24 and encloses the diodes 30 and 32 so that in general external appearance, shown in FIG. 1, the diodes as well as the voltage suppressor elements together appear as in a single rectangular assembly 22. The voltage suppressor package has a metal base plate 36 immediately adjacent and electrically joined to the heat sink 24. From the base plate 36 extend side walls 38 which may be of material such as a high strength glass laminate or of metal such as steel with appropriate insulation. Within the enclosure formed by the walls 38 are positioned cylindrical glass laminate tubes. Tubes 40 and 42 each enclose one of the diodes 30 and 32. One or more other tubes 44 are for locating bolts 45 for fastening the suppressor package to the heat sink.

Centrally disposed between the pair of diodes 30 and 32 and affixed to the metal base plate 36 is a capacitor 46 for the known purpose of suppressing voltage spikes in the rectifier circuit. One side of the capacitor 46 is electrically connected to the metal base plate 36 while the other side is electrically connected to a connection strap 48 extending over the diodes as well as the capacitor. (A diode connection terminal 49 pins the diode terminals 34 to the connection strap.) A voltage dividing resistor 50 is connected across the connection strap 48 and the metal base plate 36. At the other extreme, (to the right in FIGS. 3 and 4) a mounting 52 is provided for connection to the fuse 28 as shown in FIG. 1. Space about the capacitor 46 and the glass laminate tubes 40, 42 and 44 is filled with a suitable epoxy resin 54 to support wiring and stabilize the elements.

The positioning of the capacitor 46 between the two diodes 30 and 32, rather than at either axial extreme, is advantageous and preferred. The diodes must have a certain amount of space between them to utilize most effectively the total heat dissipating surface of the heat sink 24. Occupation of this space by the capacitor does not detract from the thermal function and means that the configurations of this invention gain considerable compactness and do not require substantially larger heat sinks to accommodate the capacitor.

It may also be advantageous to employ a resistor 56 electrically between one side of the capacitor 46 and the connection strip 48. Such a series resistor 56 should be partially exposed for dissipation of resistor losses. This optional resistor, although recognized as electrically advantageous was previously considered impractical to employ due to space limitations and wiring difficulties in rectifier wheel assemblies in accordance with prior designs. The present configuration facilitates use of such a resistor.

Ordinarily the voltage suppressor package 58 would be assembled apart from the wheel and secured in position after the diodes are affixed to the heat sink 24, after which diode terminals 34 are joined to the connection terminal 49 to complete the assembly.

Figure 5:
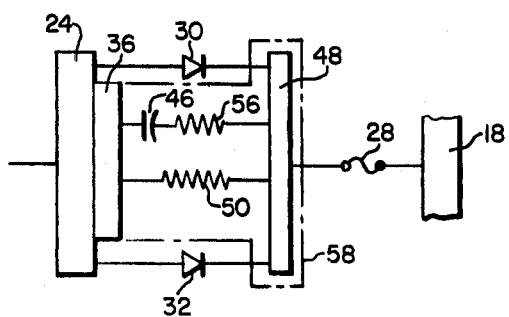
FIG. 5 is a circuit schematic indicating the electrical relationship of the elements of the invention.

FIG. 5 illustrates schematically the electrical relationship of the elements shown in FIGS. 3 and 4 with each other as well as with the fuse 28 and rectifier wheel rim 18 illustrated in FIG. 1. One electrical side of this circuit portion is provided by the heat sink 24 to which the metal base plate 36 of the suppressor package 58 as well as one side of the diodes 30 and 32 is affixed. Two parallel paths exist between the base plate 36 and the connection strap 48. One path is through the capacitor 46 and its associated series resistor 56 (if used) and the other path is through the voltage dividing resistor 50. The dashed line encloses those elements that are contained within the suppressor package 58. The fuse element 28 is connected as shown between the connection strap and the rectifier wheel.

The capacitor 46 is here connected on one side to the heat sink 24 rather than to the wheel rim as in prior designs so that it is now in series with the fuse, rather than in parallel with the fuse, and a short failure of the capacitor will open the fuse. Thus, the suppressor unit in accordance with this invention not only provides advantages of compactness and convenience in assembly and removal but also provides an electrical advantage compared with prior rectifier-compressor configurations in the brushless exciter art.

Figure 6:
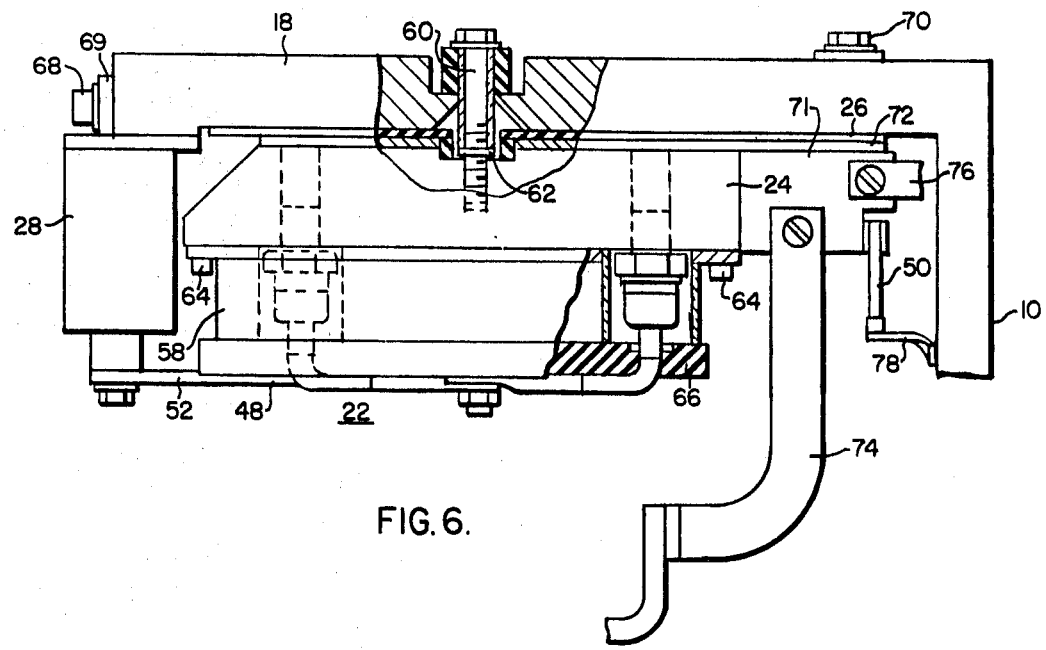
FIG. 6 is an elevational view, partly in section, of another embodiment of the present invention.

Referring now to FIG. 6 a form of the invention is shown with greater ease of removal of the components for examining or replacing them. Like reference numerals are generally used as for the corresponding elements of FIGS. 1 to 5. A segment of the rectifier wheel rim 18 is shown with a heat sink 24 on and insulated from it. The heat sink 24 is joined to the rectifier wheel rim 18 only by a single bolt 60 preferably held within the wheel by a captivating nut 62 so that merely upon loosening the bolt 60 the heat sink 24 can be removed. The diodes and capacitor configuration unit 22 may be generally as shown in FIGS. 3 and 4, however, here the mounting bolts 64 for the voltage suppressor package 58 are peripherally exposed for greater simplicity of design. Also the connection strap 48 extends over an insulating cover 66 on the suppressor package, such as one of glass laminations, which provides a convenient surface for the optional positioning of the series resistor 56 referred to in connection with FIG. 5.

The fuse 28 is fastened at one end to extremity 52 of the connection strap 48. The other end of the fuse is joined to the wheel rim 18 by bolt 68 extending through a projection 69 that is connected with the fuse. Loosening (not necessarily removing) only bolts 60 and 68 permits removal of the heat sink, diodes, suppressor, and fuse. This is highly desirable because it has been indicated that a fuse has blown and the machine is eventually shut down for replacement of the fuse, it is necessary to check the diodes and capacitor because the blowing of the fuse generally indicates that one of the diodes must have failed or, much less likely, that the capacitor has been shorted. Additionally, of course, the fuse must be replaced. The present scheme permits checking these elements apart from the wheel. Also, embodiments such as that of FIG. 6 permit removal of the components by means (e.g. bolts 60 and 68) that are exposed to the exterior of the wheel rim. This is quite significant for a number of reasons. Larger machines are presently made with hydrogen cooling and require a large hydrogen pressure vessel. Major disassembly of the pressure vessel is avoided by this invention because only a small access port is required for loosening bolts and reaching in to remove the components. Not only is time saved but risk of damage to the pressure vessel or dropping tools, bolts or other items into the machine is avoided. Also, replacement of the diodes in the heat sink requires use of a torque wrench, the use of which in the wheel assembly means additional space must be provided.

Contributing to the ease of removal of the components in FIG. 6 is the fact that a connector adapter 71 is provided next to heat sink 24 and make electrical connection with the heat sink 24 through a layer of conductive metal 72. Insulation layer 26 insulates the heat sink 24 and connector adapter 71 from the wheel rim 18. Bolt 70 holds the connector adapter 71 to the wheel rim. A phase lead 74 is joined to the connector adapter and thence (not shown) along the shaft to a phase winding of the exciter in the system. Another conductor 76 is joined to the connector adapter 71 for connection between heat sink 24 and heat sink on the other half of the wheel. A voltage dividing resistor 50 also has one end joined to the connector adapter 71; the other end of resistor 50 is joined by lead 78 to wheel 10. This connection results in some difference in equivalent circuit from the structure of FIGS. 3—5. Here the resistor 50 is in parallel across both the diodes and the fuse (rather than in series with the fuse). Both forms of connection are suitable.

The connector adapter 71 is a body having a number of terminals thereon for the connections as described. While it may be laterally adjacent the heat sink 24, as shown, it does not have any significant effect on heat dissipation in the assembly.

The use of the present invention has been found to be advantageous in that weight (and cost) can be reduced by about 30 to 40 percent over an equivalent structure made with the capacitors separate from the heat sinks. Also, component removal requires only about 10 percent as much time as in those structures where each component has to be removed from the machine individually.

While the present invention has been shown and described in a few forms only, it will be apparent that various changes may be made without departing from its true scope.

What we claim is:

1. In an excitation system for a brushless generator, the combination comprising: a rectifier wheel having an inner rim surface; a heat sink supported on said surface; at least one diode mounted in thermal and electrical contact with said heat sink; and a capacitor radially mounted in electrical contact with said heat sink.

2. The subject matter of claim 1 wherein: said heat sink is electrically insulated from said surface and a fuse is electrically connected between said wheel and one side of said at least one diode and said capacitor remote from said heat sink.

3. The subject matter of claim 2 wherein: a metal base plate is secured in electrical contact with said heat sink and has an opening permitting direct contact between said diode and said heat sink within said aperture; said capacitor is in electrical contact with said metal base plate; and a conductive connection strap connects together said one side of said diode and said capacitor and said fuse.

4. The subject matter of claim 3 wherein: a resistor is connected between said connection strap and said metal base plate.

5. The subject matter of claim 1 also comprising: a fuse electrically connected between said wheel rim and a connection strap that connects with one side of said capacitor and said at least one diode; and means accessible on the exterior of said wheel rim for securing and permitting removal of said heat sink, diode, capacitor and fuse from said wheel rim.

6. The subject matter of claim 5 wherein: said means for securing and permitting removal comprises only a first bolt joining said heat sink and said wheel rim and extending inward from the radially outside surface of said rim, and a second bolt joining said fuse and said wheel rim and extending into said rim from the axial extreme thereof.

7. In an excitation system for a brushless generator, the combination comprising: a wheel supported on a shaft, said wheel having a rim; a plurality of rectifier-voltage suppressor assemblies on an inner surface of said rim; each said assembly comprising a heat sink mounted on said surface and insulated therefrom; a pair of rectifying diodes supported on said heat sink in electrically and thermally conducting relation therewith; an enclosure around said diodes including a conductive base plate with apertures therein permitting direct contact between said diodes and said heat sink; each of said diodes being located in a radially extending tube of glass laminate material; a capacitor located within said enclosure and electrically connected in parallel across said diodes.